United States Patent
Ito (12) 
(10) Patent No.: US 11,302,045 B2
(45) Date of Patent: Apr. 12, 2022

(54) IMAGE PROCESSING APPARATUS, IMAGE PROVIDING APPARATUS, CONTROL METHODS THEREOF, AND MEDIUM

(71) Applicant: CANON KABUSHIKI KAISHA, Tokyo (JP)

(72) Inventor: Kan Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 16/117,591

(22) Filed: Aug. 30, 2018

(65) Prior Publication Data

US 2019/0073813 A1    Mar. 7, 2019

(30) Foreign Application Priority Data

Sep. 7, 2017 (JP) .............................. JP2017-172423
Jun. 27, 2018 (JP) .............................. JP2018-122357

(51) Int. Cl.
| | |
|---|---|
| *G06T 11/60* | (2006.01) |
| *G06T 5/50* | (2006.01) |
| *G06T 7/11* | (2017.01) |
| *G06T 3/40* | (2006.01) |
| *G06K 9/46* | (2006.01) |
| *G06K 9/00* | (2006.01) |

(52) U.S. Cl.
CPC .......... *G06T 11/60* (2013.01); *G06K 9/00711* (2013.01); *G06K 9/4609* (2013.01); *G06T 3/4038* (2013.01); *G06T 5/50* (2013.01); *G06T 7/11* (2017.01); *G06T 2207/20224* (2013.01)

(58) Field of Classification Search
CPC ... G06T 11/60; G06T 5/50; G06T 7/11; G06T 3/4038; G06T 2207/20224; G06K 9/00711; G06K 9/4609
See application file for complete search history.

(56) References Cited

U.S. PATENT DOCUMENTS

| | | | |
|---|---|---|---|
| 7,440,594 B2 | 10/2008 | Takenaka | |
| 10,395,056 B2* | 8/2019 | Li | ........................ G06F 21/6245 |
| 2001/0043280 A1* | 11/2001 | Suda | ...................... G03B 13/02 |
| | | | 348/341 |

(Continued)

FOREIGN PATENT DOCUMENTS

| | | |
|---|---|---|
| EP | 1 388 802 A2 | 2/2004 |
| EP | 2 157 781 A1 | 2/2010 |

(Continued)

OTHER PUBLICATIONS

Jan. 31, 2019 European Search Report in European Patent Appln. No. 18191377.3.

*Primary Examiner* — Wesley J Tucker
(74) *Attorney, Agent, or Firm* — Venable LLP (57) ABSTRACT

An image processing apparatus comprises an image obtaining unit that obtains a captured image, an information obtaining unit that obtains analysis data recorded in correspondence with the captured image and including flag information indicating whether an object present in the captured image is a masking target, a detecting unit that detects objects from the captured image, and a mask processing unit that generates an image in which an object, among the objects detected from the captured image, which is indicated as the masking target by the flag information, is masked.

13 Claims, 11 Drawing Sheets

(56) References Cited

U.S. PATENT DOCUMENTS

| | | | |
|---|---|---|---|
| 2004/0081338 A1* | 4/2004 | Takenaka | G06K 9/00221 |
| | | | 382/118 |
| 2008/0193018 A1* | 8/2008 | Masuda | G06K 9/00228 |
| | | | 382/190 |
| 2009/0207269 A1* | 8/2009 | Yoda | G06T 11/60 |
| | | | 348/222.1 |
| 2012/0008915 A1 | 1/2012 | Takahashi et al. | |
| 2016/0132719 A1* | 5/2016 | Fithian | G06F 16/5866 |
| | | | 345/647 |
| 2017/0220816 A1* | 8/2017 | Matusek | G06K 9/3233 |
| 2018/0101723 A1* | 4/2018 | Wakako | G06K 9/20 |
| 2018/0158220 A1* | 6/2018 | Van Eeuwijk | G06K 9/6215 |
| 2018/0189552 A1* | 7/2018 | Barnett | G06T 11/60 |
| 2018/0268240 A1* | 9/2018 | Loce | G11B 27/105 |
| 2019/0012793 A1* | 1/2019 | Ito | G06K 9/00369 |
| 2019/0042851 A1* | 2/2019 | Varadarajan | G06K 9/00771 |

FOREIGN PATENT DOCUMENTS

| | | |
|---|---|---|
| JP | 2004-062560 A | 2/2004 |
| JP | 2008-191884 A | 8/2008 |

* cited by examiner

FIG. 6A frame[n]

FIG. 6B

ID1 : X1, Y1)
   Human
   Privacy ON)
ID2 : X2, Y2)
   Car
   Privacy OFF)
ID3 : X3, Y3)
   Human
   Privacy OFF)
ID4 : X4, Y4)
   Other
   Privacy OFF)

FIG. 8A frame[n]

FIG. 8B

```
ID1 : X1, Y1)
    Human
    Privacy
        Gr.A OFF)
        Gr.B ON)
ID2 : X2, Y2)
    Car
    Privacy
        Gr.A ON)
        Gr.B ON)
ID3 : X3, Y3)
    Human
    Privacy
        Gr.A ON)
        Gr.B ON)
ID4 : X4, Y4)
    Other
    Privacy
        Gr.A OFF)
        Gr.B OFF)
```

IMAGE PROCESSING APPARATUS, IMAGE PROVIDING APPARATUS, CONTROL METHODS THEREOF, AND MEDIUM

BACKGROUND OF THE INVENTION

Field of the Invention

The present invention relates to an image processing apparatus, an image providing apparatus, control methods thereof, and a medium.

Description of the Related Art

In recent years, as monitoring cameras have become widely installed, there is proposed a technique for protecting the privacy of each individual who is in an image captured by a monitoring camera.

For example, Japanese Patent Laid-Open No. 2008-191884 discloses a technique of extracting a human body region in an image from a background image and performing a blurring process on the extracted region. Japanese Patent Laid-Open No. 2004-62560 discloses a technique of displaying only a specific person by extracting a face region in an image by face detecting processing and collating the extracted face region with each pre-registered face image.

In a video management system that has a function of recording the images of a monitoring camera, there is a need for protecting privacy by individually setting whether to perform mask processing in accordance with each object in a recorded image and with each user who is to view the image. In the above-described related art, although it is possible to perform privacy protection processing on a predesignated target in a captured image, it is difficult to flexibly make privacy protection settings on each object in a recorded image.

SUMMARY OF THE INVENTION

An embodiment of the present invention provides an image processing apparatus capable of flexibly performing mask processing on a captured image, an image providing apparatus, control methods thereof, and program.

According to one aspect of the present invention, there is provided an image processing apparatus comprising: an image obtaining unit configured to obtain a captured image; an information obtaining unit configured to obtain analysis data recorded in correspondence with the captured image and including flag information indicating whether an object present in the captured image is a masking target; a detecting unit configured to detect objects from the captured image; and a mask processing unit configured to generate an image in which an object, among the objects detected from the captured image, which is indicated as the masking target by the flag information, is masked.

According to another aspect of the present invention, there is provided an image providing apparatus comprising: an obtaining unit configured to obtain a captured image captured by a capturing unit; a creating unit configured to create object information which includes flag information indicating whether an object detected from the captured image obtained by the obtaining unit is a masking target; and a providing unit configured to provide, to an external apparatus, an image file obtained by encoding the captured image and an analysis data file including the object information.

According to another aspect of the present invention, there is provided a method of controlling an image processing apparatus, the method comprising: obtaining a captured image; obtaining object information which includes flag information indicating whether an object present in the captured image is a masking target; detecting objects from the captured image; and generating an image in which an object, among the objects detected from the captured image, which is indicated as the masking target by the flag information, is masked.

According to another aspect of the present invention, there is provided a method of controlling an image providing apparatus, the method comprising: obtaining a captured image captured by capturing unit; creating object information which includes flag information indicating whether an object detected from the obtained captured image is a masking target; and providing, to an external apparatus, an image file obtained by encoding the captured image and an analysis data file including the object information.

Further features of the present invention will become apparent from the following description of exemplary embodiments (with reference to the attached drawings).

DESCRIPTION OF THE EMBODIMENTS

Embodiments according to the present invention will be described hereinafter with reference to the accompanying drawings. Note that arrangements to be described in the following embodiments are merely examples, and the present invention is not limited to the illustrated arrangements.

First Embodiment

Figure 1:
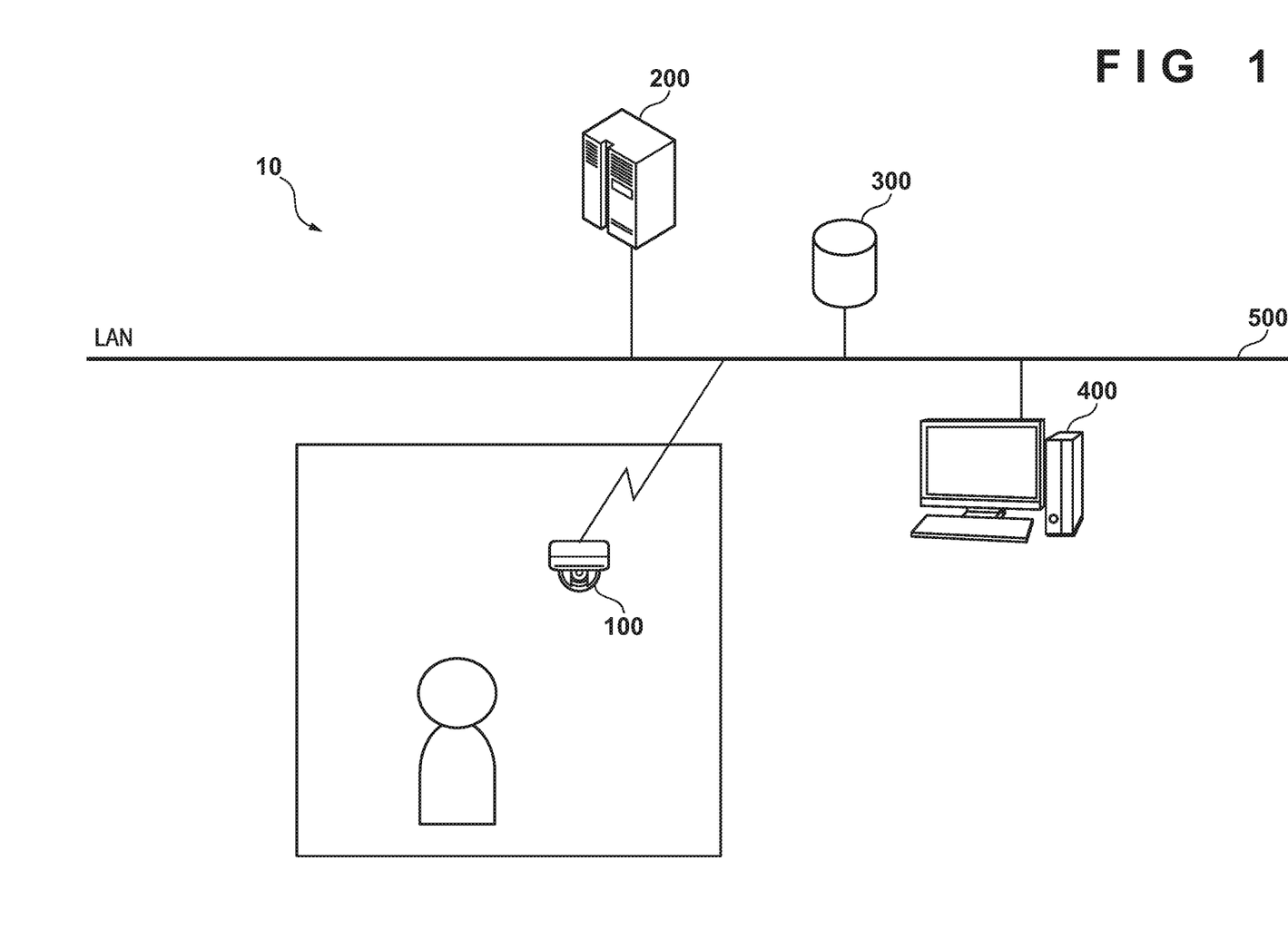
FIG. 1 is a view showing an arrangement of a monitoring camera system 10.

FIG. 1 is a view showing the arrangement of a monitoring camera system 10. The monitoring camera system 10 is an example of an image processing system and includes network cameras 100, a management server 200, a network storage apparatus 300, an image display apparatus 400, and a LAN 500 which is a network line.

Each network camera 100 is a capturing apparatus that captures a predetermined region, and is installed, for example, in a retail store, and captures images inside the store. The network camera 100 has a function of generating analysis data by performing image analysis processing on a captured image (a moving image and a still image) and executes, for example, moving-object detection, moving-object tracking, human body detection, face recognition, object detection, and the like.

The management server 200 collects pieces of analysis data and images captured by the plurality of network cameras 100 installed throughout the predetermined region. The management server 200 also collects past images and sets of analysis data recorded in the network storage apparatus 300 (to be described later). The management server 200 manages pieces of image information throughout the predetermined region by using sets of data collected in this manner. Note that the management server 200 may have an image analysis processing function. In this case, the analysis data generation function of the network camera 100 may be omitted. Also, for example, the management server 200 may generate analysis data by performing a higher level of image analysis processing on an image that could not be analyzed by the image analysis processing performed by the network camera 100.

The network storage apparatus 300 is a recording device. Images captured by each network camera 100 and analysis data obtained from image analysis processing are recorded in the network storage apparatus 300 via the LAN 500. The management server 200 functions as an image providing apparatus that provides image data and analysis data to the image display apparatus 400 in cooperation with each network camera 100 and the network storage apparatus 300.

The image display apparatus 400, as an image processing apparatus, performs display based on images and analysis data recorded in the network storage apparatus 300. The image display apparatus 400 also displays pieces of image information managed throughout the predetermined region by the management server 200. The image display apparatus 400 also has an input device function to perform an operation to search for images of a scene of an event or the like from the analysis data obtained by the image analysis processing. For example, a personal computer (PC) or the like is assumed as the image display apparatus 400. In addition, a physical connection form of each apparatus to the LAN 500 may be either wired or wireless, and the physical form is not restricted as long as each apparatus is connected to the LAN in terms of protocol. For example, a tablet terminal wirelessly connected to the LAN 500 may be used as the image display apparatus 400.

The number of the network cameras 100 suffices to be one or more, and there is no upper limit. Furthermore, the number of the management servers 200, the number of the network storage apparatuses 300, and the number of the image display apparatuses 400 to be connected to the LAN 500 are not limited to those exemplified in FIG. 1, and a plurality of apparatuses may be present for each type of apparatus as long as they can be identified by addresses or the like.

Figure 2:
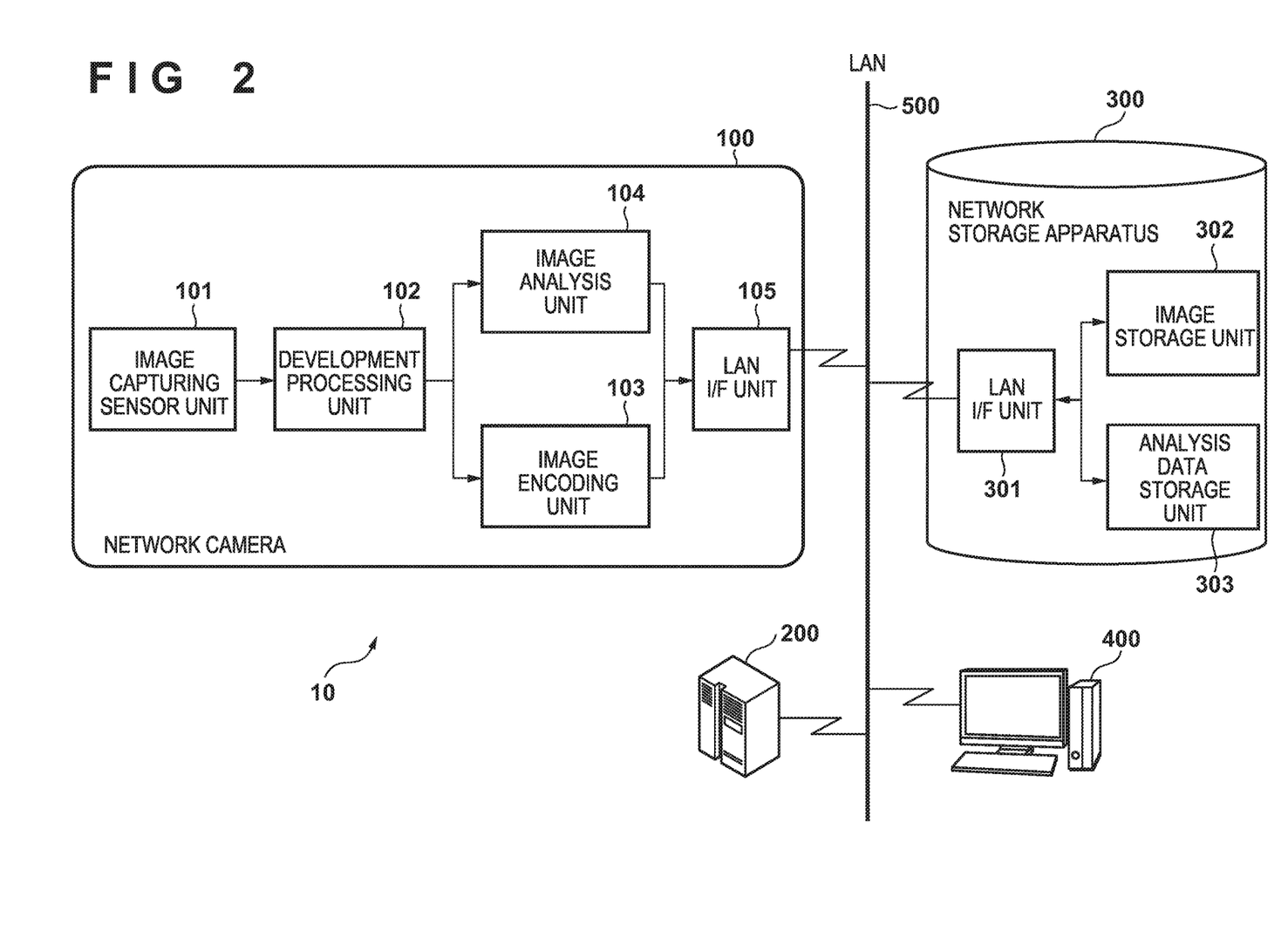
FIG. 2 is a block diagram showing a network camera 100 and a network storage apparatus 300 of the monitoring camera system 10.

FIG. 2 is a block diagram showing an example of the functional arrangement of the network camera 100 and the network storage apparatus 300 in the monitoring camera system 10. The network camera 100 includes an image capturing sensor unit 101, a development processing unit 102, an image encoding unit 103, an image analysis unit 104, and a LAN I/F unit 105.

The image capturing sensor unit 101 is an image sensing element such as a CMOS sensor which converts an optical image formed on an image sensing plane into a digital electrical signal by photoelectric conversion. The development processing unit 102 generates an RGB or YUV digital image (an "image" will include the concept of a digital image hereinafter) by performing predetermined pixel interpolation and color conversion processing on the digital electrical signal obtained by photoelectric conversion from the image capturing sensor unit 101. The development processing unit 102 also performs predetermined arithmetic processing using the developed image and performs image processing operations of white balance, sharpness, contrast, color conversion, and the like based on the obtained arithmetic result.

The image encoding unit 103 generates an image for distribution by performing compression coding, frame rate setting, and the like on the image obtained from the development processing unit 102. The compression method employed here is based on a standard such as MPEG4, H.264, MPEG, JPEG, or the like. Furthermore, each image is converted into a file in an mp4 or mov format.

The image analysis unit 104 performs object detection and recognition processing on an image obtained from the development processing unit 102, and object tracking processing is performed by adding a unique ID to each object identified from the positional relationship of the detected and recognized objects between frames. The image analysis unit 104 discriminates attributes such as a human (man or woman), an animal, a still object, other, and the like from the shape feature and behavioral feature patterns of each object. In addition, the image analysis unit adds to each object a piece of flag information indicating whether the object is a masking target (object for anonymization), that is, whether privacy protection is to be performed. Subsequently, the image analysis unit creates, as analysis data for each frame, metadata in which the position information, the attribute, and the flag information for each object are written. Note that in this embodiment, a masking target refers to a target of processing performed to make a specific individual or a thing unidentifiable in an image.

The position information of an object is information that can specify the position where the object is present. For example, the position information of an object includes the information of center coordinates of an object in an image. The object attribute discrimination method is not limited to that described above. It may be any kind of a method as long as the attribute can be discriminated such as a method of discriminating an attribute by specific object detection processing using edge features.

In addition, it may be arranged so that flag information related to privacy protection is set to either an ON state or an OFF state by default in the image analysis unit 104. Alternatively, the flag information may be automatically set in accordance with the attribute of the object so that, for example, the flag information is set to ON if the attribute is "human" and set to OFF for other attributes. In either arrangement, the flag information state can be updated by a user instruction in the management server 200. For example, it may be arranged so that an image is played back in the management server 200, the user designates individually whether to set each displayed object as a privacy protection target, and the flag information of the object is subsequently set to the ON or OFF state in accordance with the user designation. Alternatively, it may be arranged so that the state of the flag information can be changed from the predetermined image display apparatus 400. In this manner, according to this embodiment, it is possible to implement flexible privacy protection on a captured image since the privacy protection target can be set by flag information management.

The LAN I/F unit 105 constructs a network file system such as NFS, CIFS, or the like in cooperation with a LAN I/F unit 301 of the network storage apparatus 300.

The network storage apparatus 300 includes the LAN I/F unit 301, an image storage unit 302, and an analysis data storage unit 303.

The LAN I/F unit 301 constructs a network file system in cooperation with the LAN I/F unit 105 of the network camera 100 or the LAN I/F unit 401 of the image display apparatus 400.

The image storage unit 302 records, by a network file system, an image file encoded and converted into a file by the image encoding unit 103 of the network camera 100. The analysis data storage unit 303 records, via the network file system, an analysis data file that has undergone image analysis processing and has been converted into a file by the image analysis unit 104 of the network camera 100.

Figure 3:
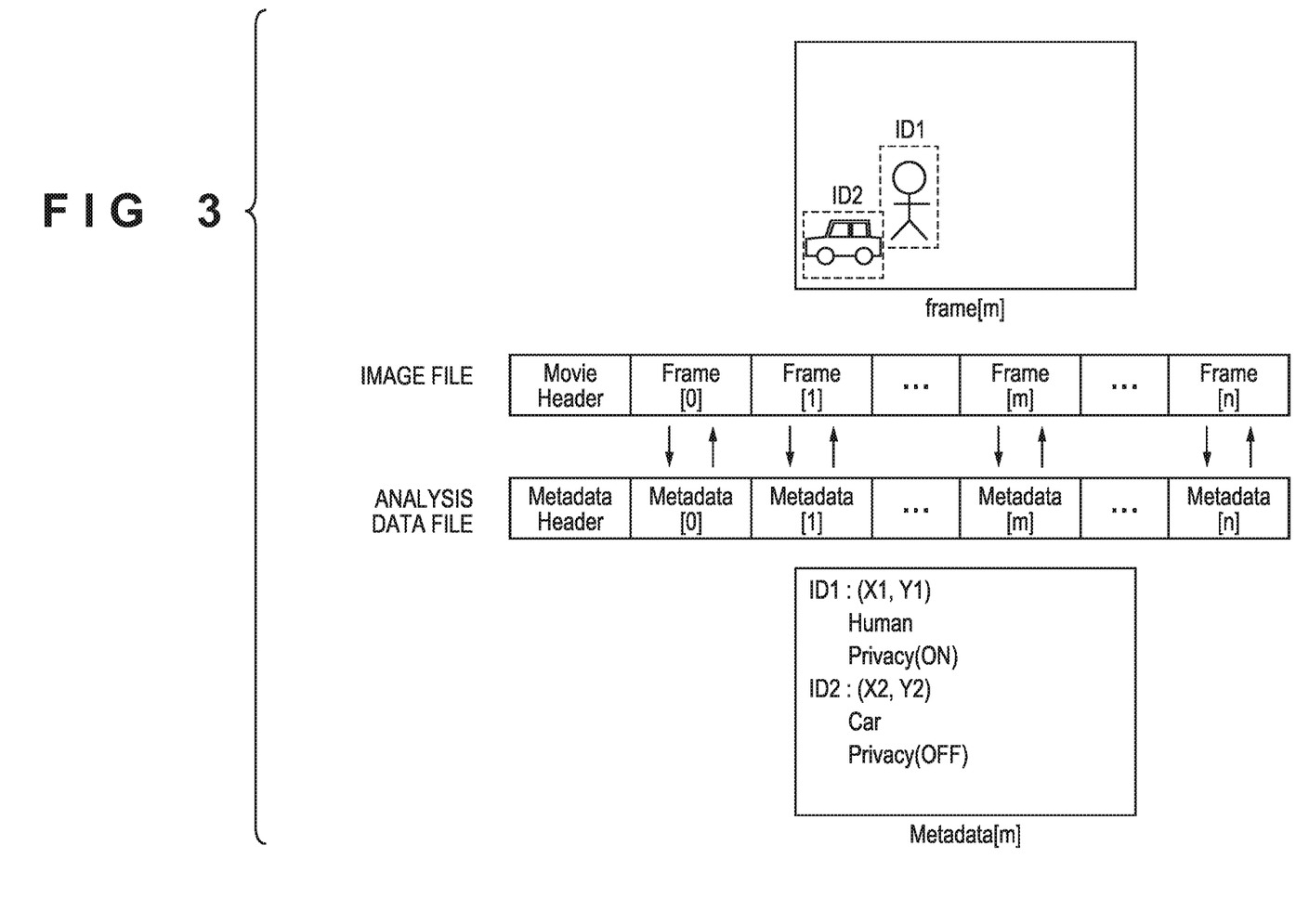
FIG. 3 is a view showing the relationship between an image file and an analysis data file.

FIG. 3 is a view showing the relationship between an image file and an analysis data file. An image file is obtained by the image encoding unit 103 of the network camera 100 encoding and converting an image into a file. An analysis data file is obtained by the image analysis unit 104 of the network camera 100 obtaining analysis data by image analysis processing and converting the analysis data into a file. As described above, analysis data which includes the position information, the attribute, and the flag information related to the privacy protection of the detected and recognized object is generated for each frame. The analysis data is, for example, metadata of a description format such as XML and is held as an analysis data file.

In FIG. 3, for example, in a set of metadata (Metadata[m]) corresponding to an image (Frame[m]) in which objects ID1 (human) and ID2 (car) that have been given unique IDs are present, the position information (for example, the center coordinates) and the attribute (Human or Car) of each object has been described. Additionally, the flag information related to the privacy protection of each object ("Privacy (ON)" representing that the privacy will be protected for ID1, and "Privacy(OFF)" representing that privacy will not be protected for ID2 in the example shown in FIG. 3) has been described in the set of metadata.

Figure 4:
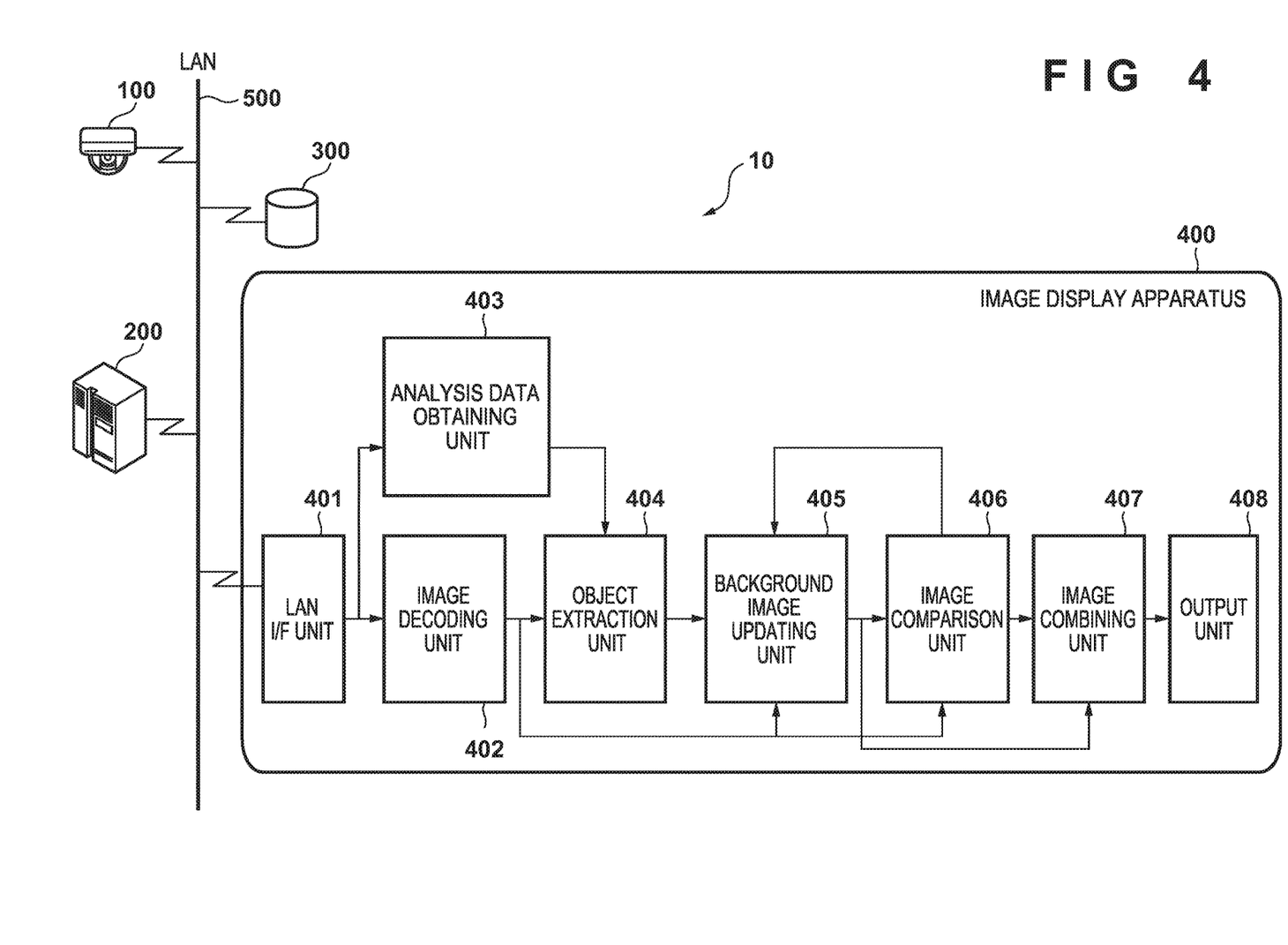
FIG. 4 is a block diagram showing an image display apparatus 400 of the monitoring camera system 10.

FIG. 4 is a block diagram showing an example of the functional arrangement of the image display apparatus 400 in the monitoring camera system 10. The image display apparatus 400 includes a LAN I/F unit 401, an image decoding unit 402, an analysis data obtaining unit 403, an object extraction unit 404, a background image updating unit 405, an image comparison unit 406, an image combining unit 407, and an output unit 408.

The LAN I/F unit 401 constructs a network file system in cooperation with the LAN I/F unit 301 of the network storage apparatus 300.

The image decoding unit 402 decompresses and decodes an image file, which is obtained via the network file system from the image storage unit 302 of the network storage apparatus 300, and outputs the decompressed and decoded image file to the object extraction unit 404, the background image updating unit 405, and the image comparison unit 406. In this manner, the LAN I/F unit 401 and the image decoding unit 402 according to this embodiment are examples of components of a captured image obtaining unit which obtains a captured image by the network camera 100.

The analysis data obtaining unit 403 obtains via the network file system an analysis data file recorded in the analysis data storage unit 303 of the network storage apparatus 300, and outputs the obtained analysis data file to the object extraction unit 404. As described above, the analysis data includes flag information, and the analysis data obtaining unit 403 according to this embodiment is an example of a component of an information obtaining unit which obtains the flag information indicating whether an object present in the captured image is a masking target.

The object extraction unit 404 performs object extraction on an image (also referred to as a decoded image) generated by the image decoding unit 402. The object extraction unit 404 extracts each object present in the decoded image by moving-object detection using a background difference method and detection of humans and the like by pattern matching. The object extraction unit 404 identifies, based on the analysis data input from the analysis data obtaining unit 403, whether each detected object is a privacy protection target object. The identification of a privacy protection target object is performed based on the position information and the flag information described in the metadata corresponding to the image (frame). The object extraction unit 404 outputs the object information to the background image updating unit 405 each time an image is processed. Note that the object information includes the position information and the shape information of the extracted object.

The background image updating unit 405 creates a background image in which each privacy protection target object has been erased based on the decoded image from the image decoding unit 402, the object information from the object extraction unit 404, and protection region ratio information (to be described later) from the image comparison unit 406. The background image updating unit outputs the created background image to the image comparison unit 406 and the image combining unit 407.

The image comparison unit 406 obtains a difference image by comparing the decoded image from the image decoding unit 402 and the background image output from the background image updating unit 405 and creates a protection image based on the difference image. For example, a luminance difference (or a color difference) is obtained on a pixel basis between the decoded image and the background image, and a region extracted by performing binarization on this luminance difference by a specific threshold is set as the protection region. A protection region is a region where an object which is to be a privacy protection target is assumed to be present. Subsequently, a protection image is created by obtaining an image (silhouette image) in which the protection region is filled by a predetermined color (for example, black) or the like. Note that instead of the silhouette image, the protection image may be created by an image in which a circumscribed rectangular region of an object is filled with a predetermined color (for example, black) so that the object to be the privacy protection target is hidden or by an image which has undergone mosaic processing so that the object cannot be identified.

The image comparison unit 406 creates the protection region ratio information indicating the ratio of the area of the protection region to the area of the image and outputs the created protection region ratio information to the background image updating unit 405. Based on this information, the background image updating unit 405 can efficiently perform update processing on the background image by determining a case in which the illumination state has dramatically changed, a case in which the capturing range of the image capturing unit has changed by control such as pan, tilt, or zoom, and the like.

The image combining unit 407 combines the protection image created by the image comparison unit 406 and the background image output from the background image updating unit 405, and provides the obtained combined image to the output unit 408. As described above, the object extraction unit 404, the background image updating unit 405, the image comparison unit 406, and the image combining unit 407 according to this embodiment function as an image processing unit that performs mask processing of masking a masking target object in a captured image based on the flag information. The output unit 408 displays the combined image created in the image combining unit 407 on a display unit. As a result, a captured image which has undergone the mask processing can be provided to the user.

Figure 10:
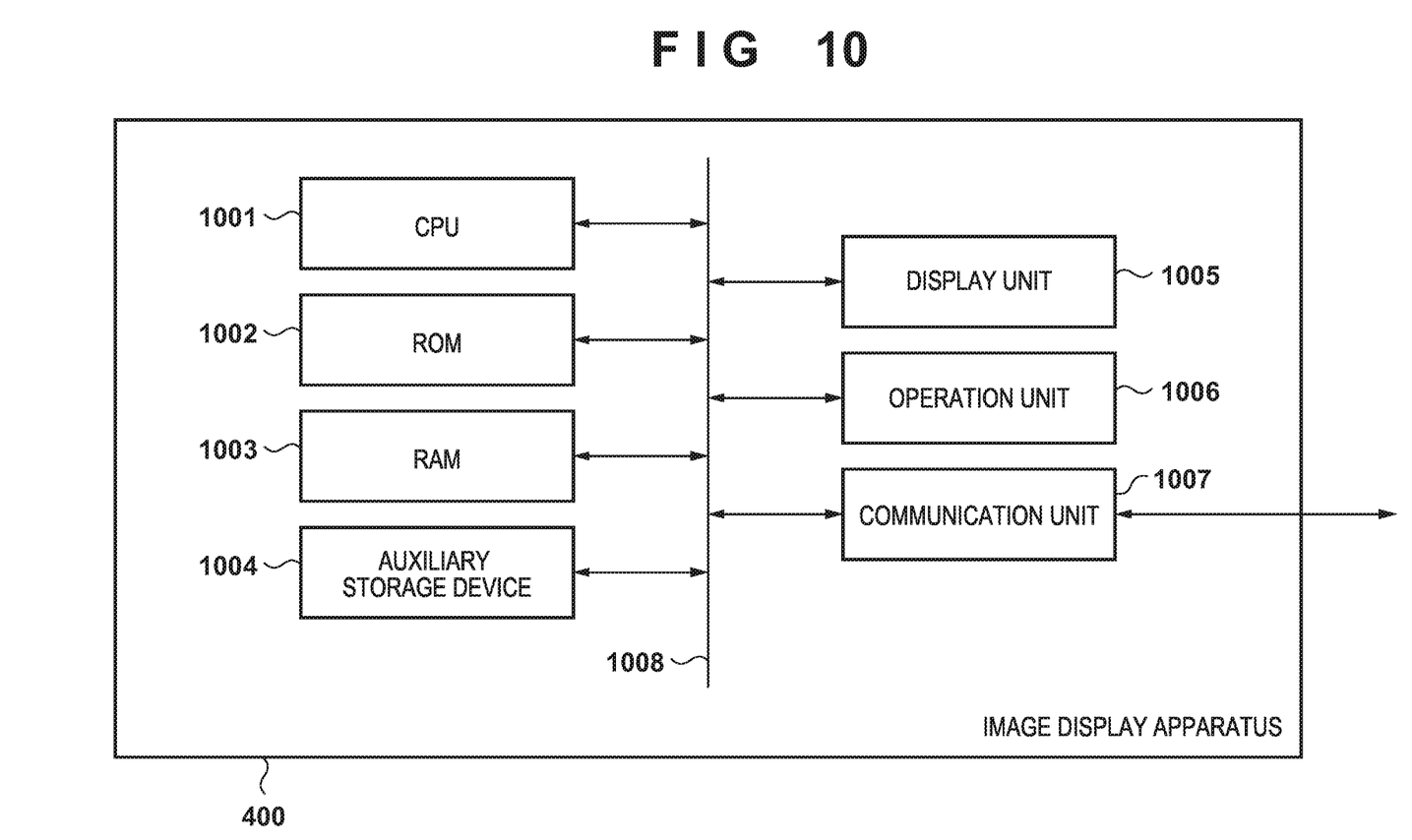
FIG. 10 is a block diagram showing an example of the hardware arrangement of the image display apparatus 400.

FIG. 10 is a block diagram showing an example of the hardware arrangement of the image display apparatus 400. Note that apparatuses such as the network camera 100, the management server 200, and the network storage apparatus 300 can be part of the hardware arrangement of FIG. 10.

The image display apparatus 400 includes a CPU 1001, a ROM 1002, a RAM 1003, an auxiliary storage device 1004, a display unit 1005, an operation unit 1006, a communication unit 1007, and a bus 1008.

The CPU 1001 controls the overall image display apparatus 400 by using computer programs and data stored in the ROM 1002 and the RAM 1003. That is, the functions of the image display apparatus 400 as described in FIG. 4 are implemented by the CPU 1001 operating in accordance with programs stored in the ROM 1002 and the like. Similarly, the functions of the network camera 100, the management server 200, the network storage apparatus 300, and the like are implemented by their respective CPUs operating in accordance with the programs.

The ROM 1002 stores parameters and programs which do not require any change. The RAM 1003 temporarily stores programs and data supplied from the auxiliary storage device 1004 and data supplied from the outside via the communication unit 1007. The auxiliary storage device 1004 is formed from, for example, a hard disk drive and the like.

The display unit 1005 is formed from, for example, a liquid crystal display and displays a GUI (Graphical User Interface) for operating the image display apparatus 400. The operation unit 1006 is formed from, for example, a keyboard, a mouse, and the like and inputs various kinds of instructions to the CPU 1001 by accepting each operation made by the user. The communication unit 1007 executes communication with external apparatuses such as the network camera 100, the management server 200, and the like. The bus 1008 transmits information by connecting the components of the image display apparatus 400.

Next, the operation of the monitoring camera system 10 according to the first embodiment the above-described arrangement will be described in detail by using the above-described arrangement.

Figure 5:
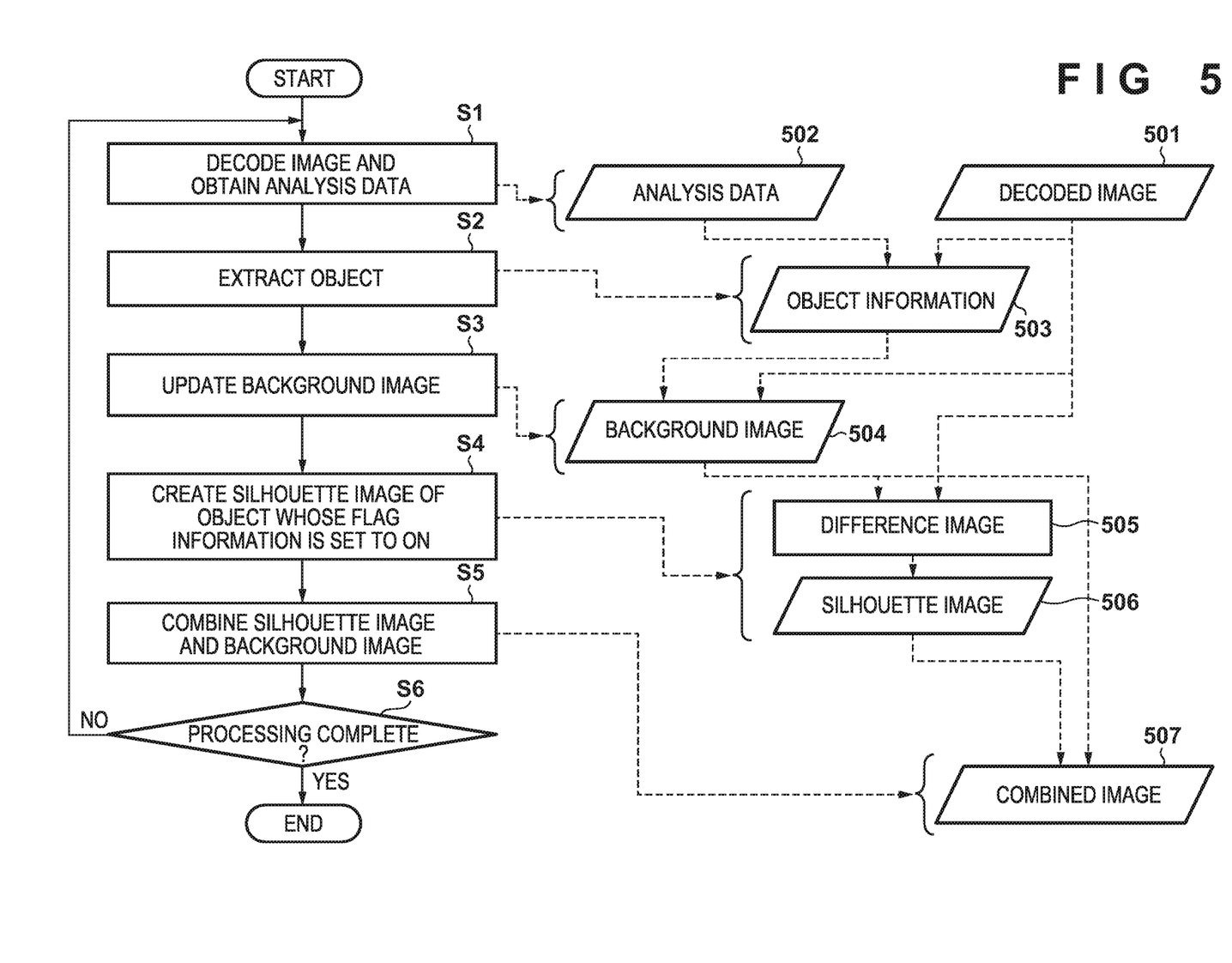
FIG. 5 is a flowchart showing an operation of the image display apparatus 400.

FIG. 5 is a flowchart showing the operation of the image display apparatus 400. In the monitoring camera system 10, an image captured by the network camera 100 undergoes image analysis processing and is recorded in the network storage apparatus 300 as an image file and an analysis data file, as described in FIG. 3, in the network storage apparatus 300. The image display apparatus 400 reads out the image file and the analysis data file from the network storage apparatus 300 and plays back the image. In this embodiment, the recording (storage)/readout of the image file and the analysis data file in/from the network storage apparatus 300 is performed via the management server 200. Note that the following operation is executed by the CPU 1001 in accordance with a program stored in the ROM 1002 of the image display apparatus 400.

In step S1, the image decoding unit 402 generates a decoded image 501 by decoding an image read out from the image storage unit 302 of the network storage apparatus 300. The analysis data obtaining unit 403 obtains, from the analysis data storage unit 303, analysis data 502 by reading out the analysis data file in synchronization with the readout of the image file.

In step S2, the object extraction unit 404 detects each object from the decoded image 501 by using, for example, the background difference method, the pattern matching method, and the like. The object extraction unit 404 generates object information 503 by identifying each object which is to be a privacy protection target and each object which is not to be a privacy protection target based on the analysis data 502. The object extraction unit 404 outputs each piece of the generated object information to the background image updating unit 405.

In step S3, the background image updating unit 405 performs update processing on the background image based on the decoded image 501 and each corresponding piece of object information 503 and generates, as a background image 504, an image in which each privacy-protection target object has been erased from the input image.

In step S4, the image comparison unit 406 obtains a difference image 505 by comparing the decoded image 501 input from the image decoding unit 402 and the background image 504 updated by the background image updating unit 405. The image comparison unit subsequently creates a silhouette image 506 as a protection image based on the difference image 505. This silhouette image 506 is an image showing each object whose flag information related to privacy protection has been set to ON.

In step S5, the image combining unit 407 creates a combined image 507 by combining the background image 504 generated by the background image updating unit 405 in step S3 and the silhouette image 506 generated by the image comparison unit 406 in step S4, and the combined image is output to the output unit 408. As described above, a protection image (silhouette image 506) is generated by performing silhouette processing on the protection region which is determined based on the difference image 505 of the decoded image 501 as the captured image and the background image 504 in which each privacy protection target object has been erased. Subsequently, the combined image 507, in which each privacy protection target object is masked, is obtained by combining the protection image and the background image.

In step S6, a control unit (not shown) that controls the overall image display apparatus 400 determines whether to end the above described processing. If the control unit determines not to end the processing (NO in step S6), the process returns to step S1. If the control unit determines to end the processing (YES in step S6) such as a case in which the processing for all of the frames of the read image file has been completed or the like, the processing ends.

Figure 6A:
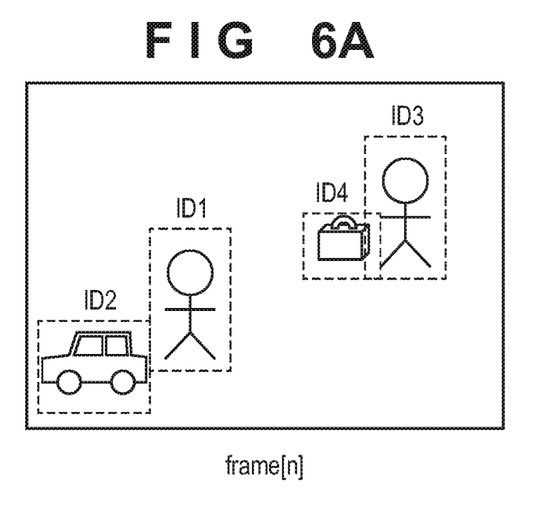
FIGS. 6A and 6B are views showing the association of an image and metadata in a predetermined frame.
Figure 6B:
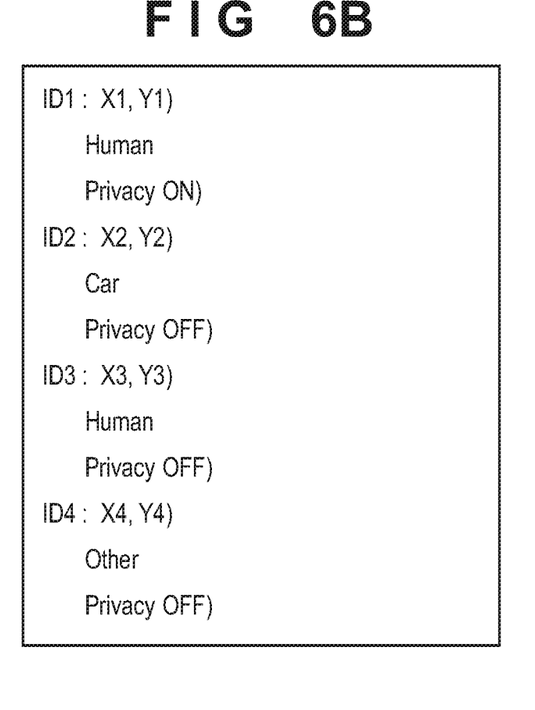

FIGS. 6A and 6B are views showing the association between an image (FIG. 6A) and a set of metadata (FIG. 6B) in a given frame n. FIG. 6A shows an image of the frame n and objects ID1 to ID4 are in the image. FIG. 6B is the set of metadata that the image analysis unit 104 of the network camera 100 has created by analyzing the image of the frame n. Here, the piece of flag information related to privacy protection of the object ID1 has been set to ON (that is, set to protect the privacy of the object), and the pieces of flag information of other objects have been set to OFF.

Figure 6C:
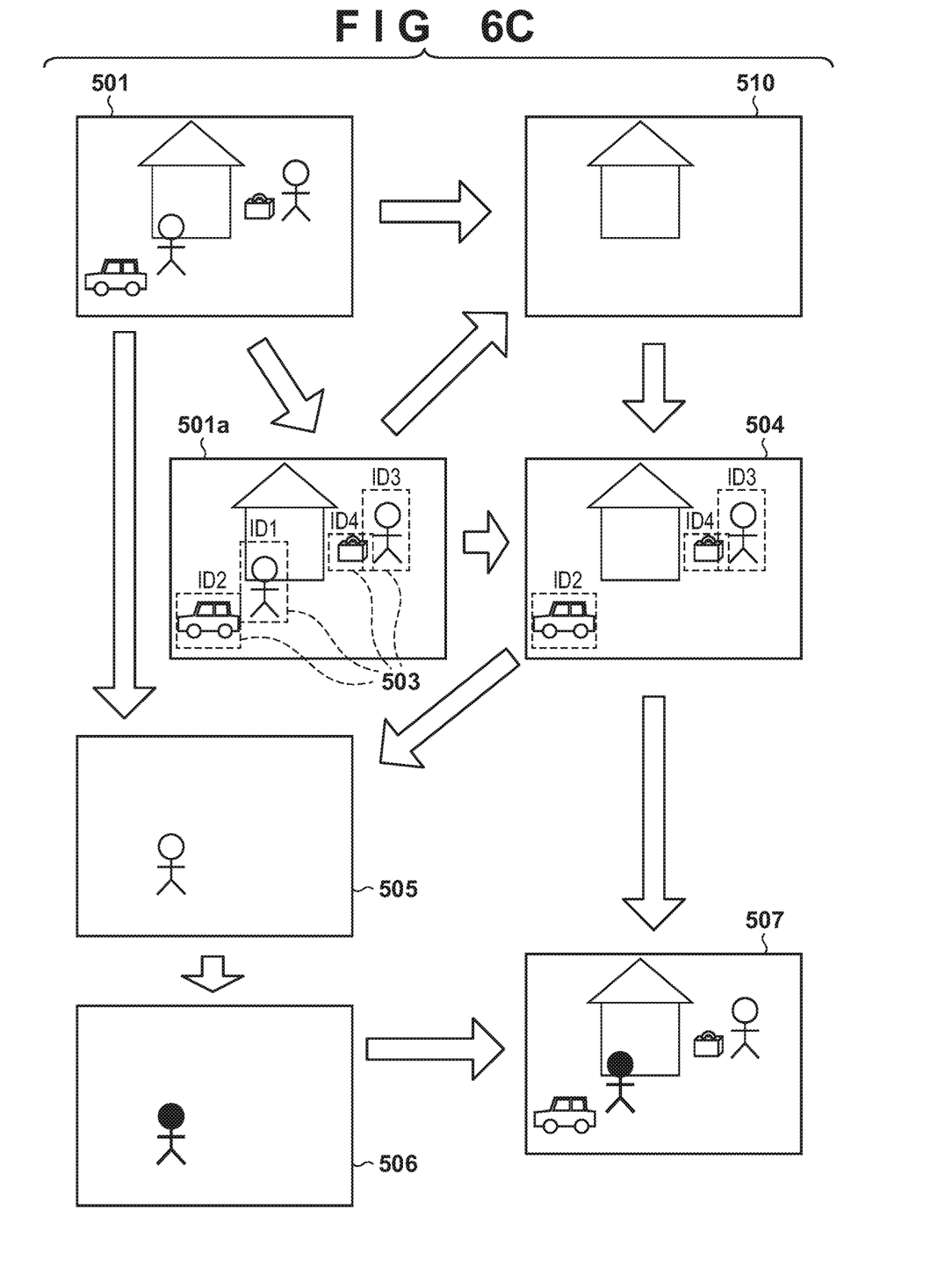
FIG. 6C is a view for explaining the generation of a privacy protection image.

FIG. 6C is a view for explaining a more specific example of privacy protection image generation according to this embodiment. In FIG. 6C, the decoded image 501 is an image of the frame n which has been decoded by the image decoding unit 402. The object extraction unit 404 detects each object from the decoded image 501 by using the background difference method, the pattern matching method, and the like. Each piece of object information 503 is obtained by applying the flag information to an object detected from the decoded image 501 based on the corresponding position information included in the analysis data. This process is illustrated in the image 501a. In the image 501a, the object information including the identification information, the position information, the shape information, and the flag information is obtained for each of the four extracted objects. Note that although the shape information is indicated by a rectangle surrounding each object, the present invention is not limited to this. For example, if an object is extracted by the background difference method, the shape information may be formed by a set of pixels in the extracted object.

A background image 510 is generated by the background image updating unit 405 based on each of decoded images which are sequentially obtained in time series from the image decoding unit 402 and the object detection result from the object extraction unit 404. For example, the background image updating unit 405 divides an image into a plurality of blocks and measures, for each block, the time (stable background time) in which change has not occurred. While the stable background time of each block is being measured, the stable background time of a block that includes an extracted object region is reset to zero. To update the background image, the background image updating unit 405 updates an image in a block whose stable background time has exceeded a predetermined value by using a corresponding block image of the decoded image 501 which is obtained from the image decoding unit 402. In the update operation, the block image in the background image can be replaced by a corresponding block image in the decoded image 501 or the average or the weighted average of both block images can be used.

In this embodiment, the background image updating unit 405 further arranges, among the objects extracted by the object extraction unit 404, each object whose flag information is set to OFF on the background image 510. In the example of FIG. 6C, the flag information of each of the objects ID2 to ID4 has been set to OFF, and the images of these objects are arranged on the background image 510. Thus, the background image 504 is obtained as a result of this process. In this manner, the background image updating unit 405 obtains the background image 504 in which the object which is a privacy protection target has been erased from the input image (the decoded image 501).

The image comparison unit 406 obtains the difference image 505 by obtaining the difference between the decoded image 501 generated by the image decoding unit 402 and the background image 504 generated by the background image updating unit 405, and the image comparison unit obtains the silhouette image 506 by converting the difference image into a silhouette. The image combining unit 407 generates the combined image 507 by combining the silhouette image 506 and the background image 504 generated by the background image updating unit 405. As a result, an image in which the object (that is, the masking target object) whose flag information indicating privacy protection is ON has been converted into a silhouette is obtained.

Figure 7:
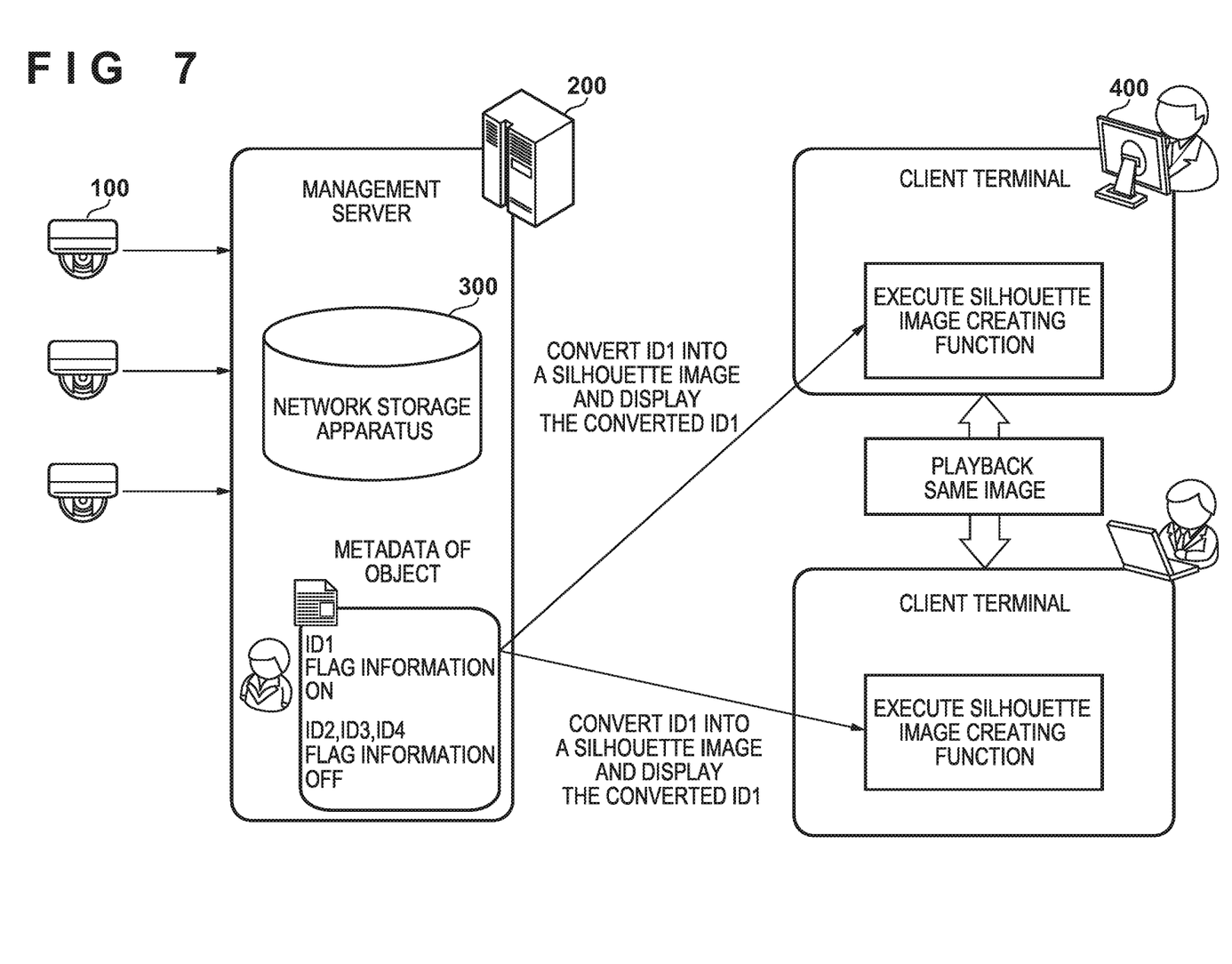
FIG. 7 is a view showing the operation states of client terminals.

FIG. 7 is a view showing the operation state of the monitoring camera system 10 when metadata as shown in FIG. 6B has been added. In FIG. 6B, the flag indicating the execution of privacy protection has been added only to the human of the object ID1. Hence, when the recorded image is to be played back in each client terminal (image display apparatus 400), the object ID1 is displayed as a silhouette in every client terminal. Since the flag information included in the analysis data can be set for each object, the privacy protection setting (mask setting) can be made flexibly.

Although the background image and the silhouette image are combined by the image combining unit 407 in the first embodiment, the combining of the silhouette image is not limited to the background image. The silhouette image may be combined with any kind of image such as a completely black image, a fixed background image that has been prepared in advance, or the like. Note that the output destination of the output unit 408 is not limited to the display apparatus, and the output destination may be another apparatus such as a different network or storage apparatus.

Second Embodiment

In the first embodiment, the object information that includes the flag information indicating whether to execute privacy protection (whether to set as a masking target) was set for each object present in the captured image. Although one piece of flag information is included in a piece of object information in the first embodiment, the present invention is not limited to this. Two or more pieces of flag information may be included in a piece of object information. In the second embodiment, the flag information related to privacy protection which is to be written in the metadata of the analysis data file will be set for each user group of the user who is to perform the image playback (viewing) operation. This allows a different privacy protection processing function to be set for each user group.

Figure 8A:
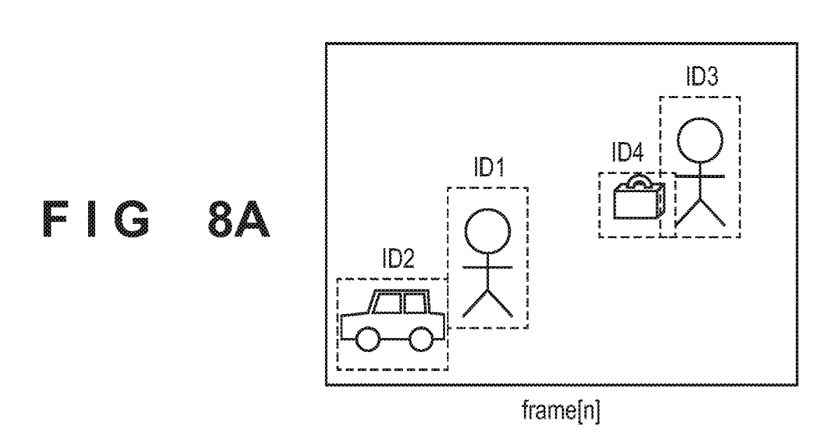
FIGS. 8A and 8B are views showing the association of an image and metadata in a predetermined frame.
Figure 8B:
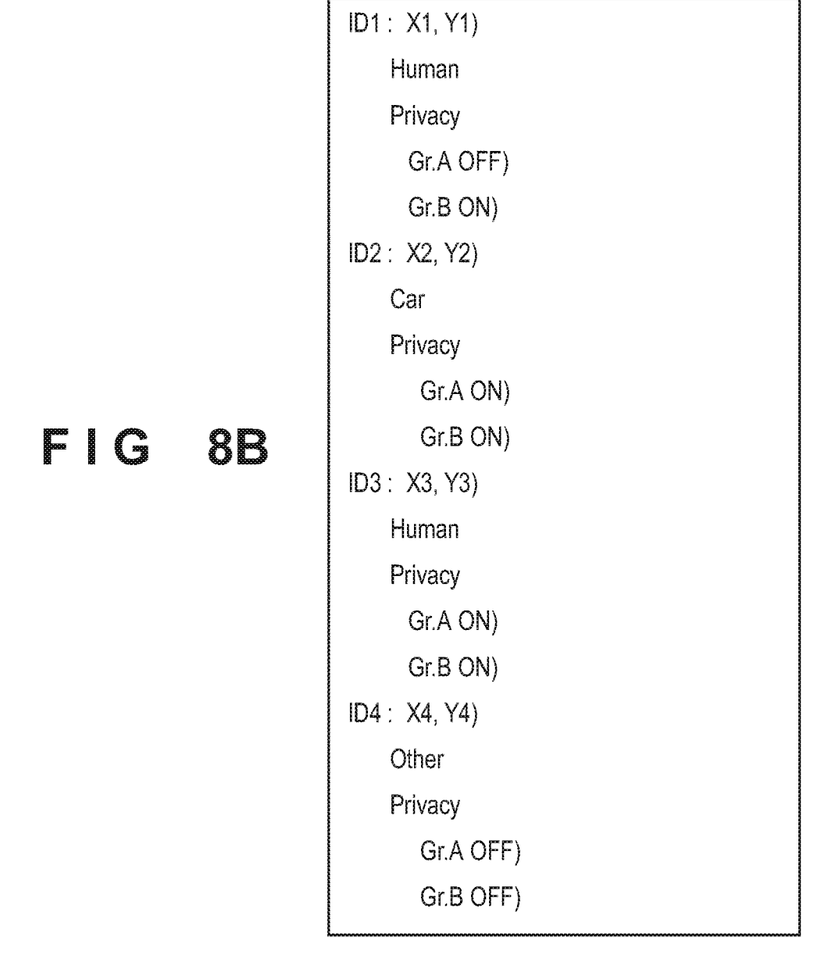

FIGS. 8A and 8B are views showing the association between an image (FIG. 8A) and metadata (FIG. 8B) in a given frame n. The flag information related to privacy protection written in the metadata shown in FIG. 8B differs from that shown in FIG. 6B.

Here, for each object, a flag indicating whether to perform privacy protection has been added with respect to each of a user group A (Gr.A) and a user group B (Gr.B). For example, a flag indicating that privacy protection will not be performed (OFF) with respect to the user group A and a flag indicating that privacy protection will be performed (ON) with respect to the user group B have been set for the human of an object ID1. On the other hand, flags indicating that privacy protection will be performed (ON) with respect to both user groups A and B have been set for the human of an object ID3.

Figure 9:
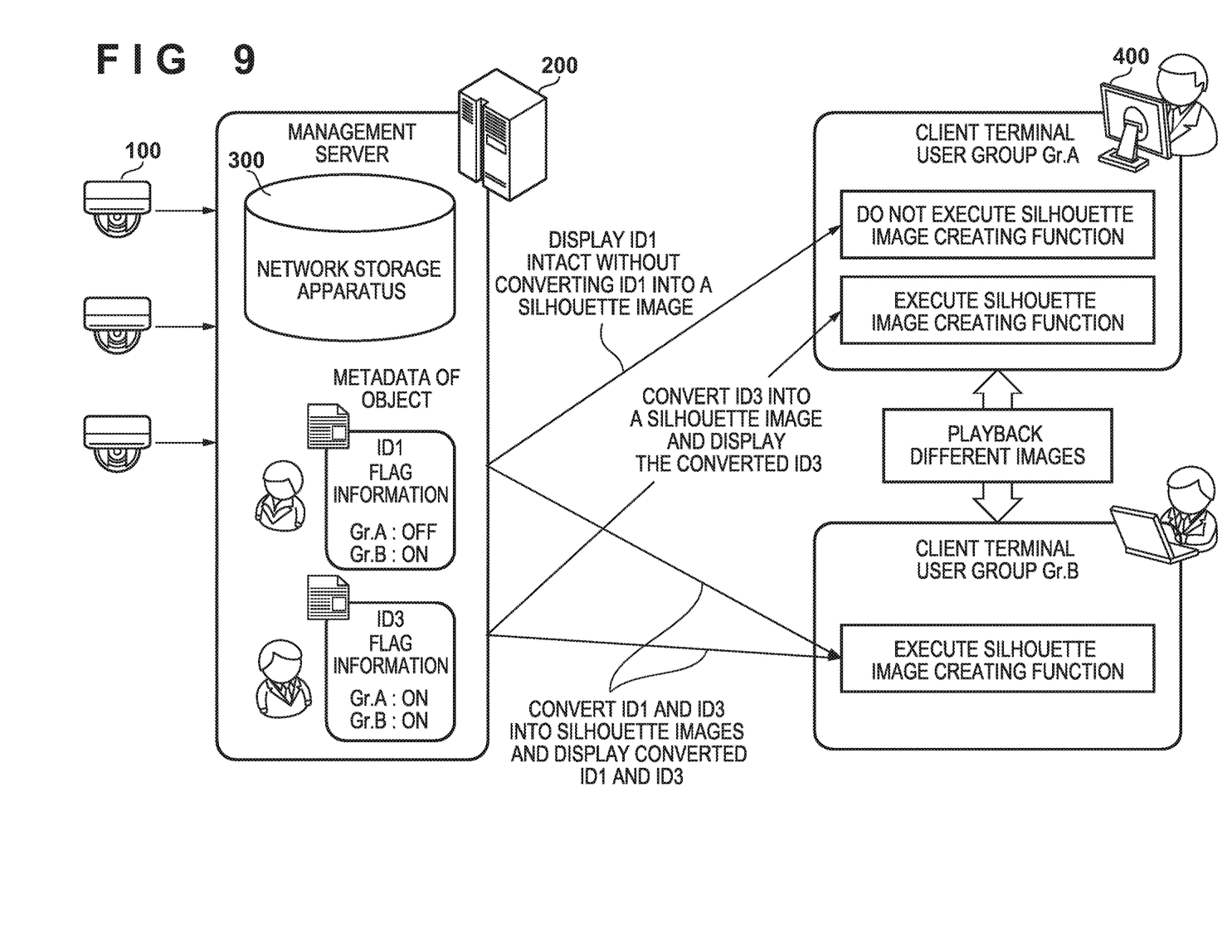
FIG. 9 is a view showing the operation states of client terminals.

FIG. 9 is a view showing the operation state corresponding to FIGS. 8A and 8B. In an image display apparatus 400a belonging to the user group A, although the human of the object ID3 has undergone privacy protection by being converted into a silhouette, the human of the object ID1 is displayed intact without being converted into a silhouette. On the other hand, in an image display apparatus 400b belonging to the user group B, both humans of the objects ID1 and ID3 have been converted into silhouettes. In this manner, in the second embodiment, an image can be played back with different privacy protection targets for each user or user group.

Note that although the privacy protection flag is set for each user group in the above description, the present invention is not limited to this. For example, the privacy protection flag may be set for each user, for each terminal which is to playback the image, or for each location of the terminal.

This allows privacy protection display control to be performed in accordance with the various installation locations, for example, from general places to high security places such as a clean room, a police organization, and a site placed under security, of terminals that are to play back the image.

Other Embodiments

Although the embodiments have been described in detail above, the present invention can take an embodiment as a system, an apparatus, a method, a program, a recording medium (storage medium), or the like. More specifically, the present invention may be applied to a system constituted by a plurality of devices (for example, a host computer, an interface device, an imaging apparatus, and a Web application), or an apparatus formed from one device.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-172423, filed Sep. 7, 2017, and No. 2018-122357, filed Jun. 27, 2018, which are hereby incorporated by reference herein in their entirety.

What is claimed is:

1. An image processing apparatus comprising a computer executing instructions that, when executed by the computer, cause the computer to function as:
   (1) an image obtaining unit configured to obtain a captured image;
   (2) a generating unit configured to generate metadata for the captured image by detecting an object in the captured image, the metadata including (a) position information indicating a position of the object detected in the captured image, (b) flag information indicating whether the object detected in the captured image is a target of privacy protection, and (c) attribute information indicating whether the object detected in the captured image is human, wherein the flag information is automatically set for each object present in the captured image based on the attribute information such that (a) the flag information indicating the object detected in the captured image is a target of privacy protection is set when the attribute information indicates the object detected in the captured image is human and (b) the flag information indicating the object detected in the captured image is not a target of privacy protection is set when the attribute information indicates the object detected in the captured image is not human, and wherein the flag information which is set in advance for each object in the captured image is updatable based on user designation for each object in the captured image being displayed; and
   (3) an output unit configured to output the metadata and the captured image to an external apparatus, the output metadata being used for determining which object in the captured image is to be obscured for protecting privacy.

2. The image processing apparatus according to claim 1, wherein the metadata includes, for each of a plurality of objects detected in the captured image, (a) the position information, (b) the flag information, and (c) the attribute information.

3. The image processing apparatus according to claim 1, wherein a protection image is generated in which the object indicated as the target of privacy protection by the flag information is obscured.

4. The image processing apparatus according to claim 3, wherein in the protection image, silhouette processing or mosaic processing has been performed on the region of the object indicated as the target of privacy protection.

5. The image processing apparatus according to claim 3, wherein in the protection image, silhouette processing or mosaic processing has been performed on a rectangular region surrounding the object indicated as the target of privacy protection.

6. The image processing apparatus according to claim 1, wherein the image obtaining unit obtains a captured image for each frame forming a moving image, and
   wherein the generating unit generates the metadata in synchronization with each frame.

7. The image processing apparatus according to claim 1, wherein the flag information is set (1) for each user who is to view the captured image, (2) for each user group of the user who is to view the captured image, (3) for each image display apparatus which is to display the captured image, or (4) for each installation location of the image display apparatus which is to display the captured image.

8. An information processing method comprising:
   obtaining a captured image;
   generating metadata for the captured image by detecting an object in the captured image, the metadata including (a) position information indicating a position of the object detected in the captured image and (b) flag information indicating whether the object detected in the captured image is a target of privacy protection, and (c) attribute information indicating whether the object detected in the captured image is human, wherein the flag information is automatically set for each object present in the captured image based on the attribute information such that (a) the flag information indicating the object detected in the captured image is a target of privacy protection is set when the attribute information indicates the object detected in the captured image is human and (b) the flag information indicating the object detected in the captured image is not a target of privacy protection is set when the attribute information indicates the object detected in the captured image is not human, and wherein the flag information which is set in advance for each object in the captured image is updatable based on user designation for each object in the captured image being displayed; and outputting the metadata and the captured image to an external apparatus, the output metadata being used for determining which object in the captured image is to be obscured for protecting privacy.

9. A non-transitory computer-readable storage medium storing a program for causing a computer to execute a method, the method comprising:

obtaining a captured image;

generating metadata for the captured image by detecting an object in the captured image, the metadata including (a) position information indicating a position of the object detected in the captured image, (b) flag information indicating whether the object detected in the captured image is a target of privacy protection, and (c) attribute information indicating whether the object detected in the captured image is human, wherein the flag information is automatically set for each object present in the captured image based on the attribute information such that (a) the flag information indicating the object detected in the captured image is a target of privacy protection is set when the attribute information indicates the object detected in the captured image is human and (b) the flag information indicating the object detected in the captured image is not a target of privacy protection is set when the attribute information indicates the object detected in the captured image is not human, and wherein the flag information which is set in advance for each object in the captured image is updatable based on user designation for each object in the captured image being displayed; and outputting the metadata and the captured image to an external apparatus, the output metadata being used for determining which object in the captured image is to be obscured for protecting privacy.

10. The image processing apparatus according to claim 1, wherein the flag information for the object in the captured image is changeable based on the user designation for designating whether to set the object in the captured image as the target of the privacy protection.

11. The image processing apparatus according to claim 1, further comprising an imaging sensor configured to convert an optical image formed on an image sensing plane into a digital electrical signal, wherein the image obtaining unit is configured to obtain the captured image based on the digital electrical signal.

12. The image processing apparatus according to claim 1, wherein the external apparatus is connected with the image processing apparatus via a network.

13. The image processing apparatus according to claim 1, wherein the attribute information indicates any one of human, an animal, or a still object.

* * * * *